(12) United States Patent
Basterrechea Sánchez

(10) Patent No.: US 11,888,274 B2
(45) Date of Patent: Jan. 30, 2024

(54) ELECTRICAL CONNECTION DEVICE

(71) Applicant: Atressa Global Corporation, S.L., Derio. Bizkaia (ES)

(72) Inventor: Cesar Basterrechea Sánchez, Derio. Bizkaia (ES)

(73) Assignee: ATRESSA GLOBAL CORPORATION, S.L., Derio (ES)

( * ) Notice: Subject to any disclaimer, the term of this patent is extended or adjusted under 35 U.S.C. 154(b) by 0 days.

(21) Appl. No.: 17/791,962

(22) PCT Filed: Jan. 12, 2021

(86) PCT No.: PCT/ES2021/070008
§ 371 (c)(1),
(2) Date: Jul. 11, 2022

(87) PCT Pub. No.: WO2021/144486
PCT Pub. Date: Jul. 22, 2021

(65) Prior Publication Data
US 2023/0047376 A1 Feb. 16, 2023

(30) Foreign Application Priority Data
Jan. 14, 2020 (ES) .................. P202030017

(51) Int. Cl.
*H01R 33/94* (2006.01)
*H01R 33/20* (2006.01)
(Continued)

(52) U.S. Cl.
CPC ............ *H01R 33/94* (2013.01); *H01R 33/20* (2013.01); *H01R 33/97* (2013.01); *H01R 2103/00* (2013.01)

(58) Field of Classification Search
CPC .............. B60Q 2800/20; B60Q 1/0088; B60Q 1/2657; H01R 4/48; H01R 33/02;
(Continued)

(56) References Cited

U.S. PATENT DOCUMENTS

| 6,155,195 A | 12/2000 | Nirenberg |
| 7,736,194 B1 * | 6/2010 | Chang ................... H01R 13/111 439/675 |

(Continued)

FOREIGN PATENT DOCUMENTS

GB 2413712 A 11/2005

OTHER PUBLICATIONS

International Search Report for related PCT patent application PCT/ES2021/070008 issued by the European Patent Office and dated Mar. 31, 2021, in English, 3 pgs.

(Continued)

*Primary Examiner* — Jean F Duverne
(74) *Attorney, Agent, or Firm* — Hassan Abbas Shakir; Shakir Law PLLC

(57) ABSTRACT

An electrical connection device is enabled to be linked materially and electrically to an external support that has an electric potential difference, and at the same time enabled to be linked materially and electrically to an external electrically operated device, and therefore for transmitting electric potential between the external support and the external device, which includes a base that incorporates a spring and a shaft enabled for receiving and transmitting the electric potential difference from the external support and is arranged and enabled on the same base in order to make electrical contact with the support of a compressive force on the spring.

20 Claims, 7 Drawing Sheets

(51) Int. Cl.
*H01R 33/97* (2006.01)
*H01R 103/00* (2006.01)

(58) Field of Classification Search
CPC ........ H01R 33/94; H01R 33/20; H01R 33/97; G08B 5/36
See application file for complete search history.

(56) References Cited

U.S. PATENT DOCUMENTS

| | | | | |
|---|---|---|---|---|
| 8,690,606 B2* | 4/2014 | Kalavitz | ................ | H01R 13/14 439/611 |
| 2004/0137782 A1* | 7/2004 | Weingartner | ............ | H01R 4/26 439/404 |
| 2008/0248669 A1* | 10/2008 | Wing | ...................... | H01R 13/53 439/207 |
| 2012/0289082 A1* | 11/2012 | Kalavitz | ................ | H01R 43/20 362/431 |
| 2016/0380400 A1* | 12/2016 | Chen | ...................... | H01R 33/22 439/620.02 |

OTHER PUBLICATIONS

Written Opinion of the International Searching Authority for related PCT patent application PCT/ES2021/070008 issued by the European Patent Office and uploaded to WIPO dated Jul. 22, 2021, in English, 10 pgs.

* cited by examiner

ELECTRICAL CONNECTION DEVICE

CROSS-REFERENCE TO RELATED APPLICATIONS

This application is a national stage under 35 U.S.C. § 371 of PCT patent application PCT/ES2021/070008 filed on 12 Jan. 2021, which is pending and which is hereby incorporated by reference in its entirety for all purposes. PCT/ES2021/070008 claims priority to Spanish Patent Application P202030017 filed on 14 Jan. 2020, which is hereby incorporated by reference in its entirety for all purposes.

FIELD OF THE INVENTION

The present invention is directed to an improved electrical connection device, which incorporates notable innovations and advantages compared to techniques used hitherto.

More specifically, the invention proposes the development of an improved electrical connection device which, due to the particular arrangement thereof, allows for an electrical connection to a previously existing support and the consequent power supply to an electrical device, for example lighting, in a simple, precise and effective way.

BACKGROUND OF THE INVENTION

In the current state of the art, a wide range of electrical and luminous devices are known for signaling vehicles with special characteristics, such as agricultural vehicles, large-sized transport vehicles, forklifts, etc.

A particular application of these devices is that in which the device is assembled and disassembled according to the requirements marked by the load.

The assembly is carried out on power supply supports installed in the vehicle itself, such as those corresponding to standard DIN 14620, which have an external ring or terminal connected to a negative pole and another internal terminal connected to a positive pole.

To establish the electrical connection between the vehicle's power supply support and the device, the usual solution known in the state of the art is to use a central pivot that locks in an internal terminal of the support (positive pole) and another terminal of the support (negative pole) that rubs against an external ring of the same pivot.

The latter terminal requires a specific tool in order to come in contact with the aforementioned external ring, and it enables it to be fixed to the assembly and remain isolated from the central pivot.

All of this entails a costly solution due to the handling required and the investment in necessary tools.

Moreover, the terminal that rubs against the walls of the support may not have proper contact due to the internal tolerances of the fixing support and the terminal itself.

Therefore, the need arises for a connection means that is reliable, with low sensitivity to manufacturing tolerances, easy to assemble, with a low manufacturing cost, and avoids specific tools that involve large investments and little flexibility.

The present invention helps to solve and overcome the present problem since it allows for an electrical connection to a previously existing support and the consequent power supply to an electrical device, for example lighting, in a simple, precise and effective way.

DESCRIPTION OF THE INVENTION

The present invention has been developed with the aim of providing an improved electrical connection device, enabled to be linked materially and electrically to an external support that has an electric potential difference, and at the same time enabled to be linked materially and electrically to an external electrically operated device, and therefore for transmitting electric potential between said external support and said external device, essentially characterised in that it comprises a base that incorporates a spring and a shaft enabled for receiving and transmitting the electric potential difference from the external support, and being arranged and enabled on the same base in order to make electrical contact with the support by means of a compressive force on said spring.

Preferably, in the improved electrical connection device, the spring and the shaft both have one same axial axis as the base and at the same time pass through the base.

Preferably, the improved electrical connection device further comprises an annular clamping piece; the base being provided with a first hollow cylindrical housing that extends from the same base and shares one same axial axis, said first cylindrical housing having the external surface thereof threaded and the external end thereof opposite its contact with the base having a conical geometry, and the same first cylindrical housing having longitudinal grooves that extend to the same external end thereof; said first cylindrical housing being configured to receive the insertion and adjustment in the internal contour thereof of the electrical connection support; the annular piece having the internal surface thereof threaded and the internal surface thereof also having a conical geometry in an area of the same annular piece adjacent to the outside thereof; the first cylindrical housing and the annular piece being mutually configured so that the annular piece can be threaded and tightened on the outside of the first cylindrical housing, the conical geometries thereof also being complementary, at the same time that the same first cylindrical housing has the external electrical connection support inserted and adjusted therein.

Alternatively, in the improved electrical connection device, the base has a second hollow cylindrical housing with the same axial axis as the base and as the first cylindrical housing, extending from the same base in a direction opposite to the first cylindrical housing; said second cylindrical housing being internally in communication and in continuity with the inside of the first cylindrical housing.

Preferably, in the improved electrical connection device, the shaft and the spring have one of the ends thereof in the first cylindrical housing and the other opposite end thereof in the second cylindrical housing.

Preferably, in the improved electrical connection device, the second cylindrical housing is enabled to contain the spring arranged in the very contour thereof and around the same axial axis thereof, the spring having a straight termination parallel to the axial axis thereof and protruding from the same second cylindrical housing at the end of the same second cylindrical housing opposite its contact with the base itself, said termination also being enabled for connecting a terminal for wires.

Preferably, in the improved electrical connection device, the spring is contained inside the vertical wall of the second cylindrical housing.

Preferably, in the improved electrical connection device, the second cylindrical housing has a passage enabled to be crossed through by the termination of the spring and the protrusion thereof from the same second cylindrical housing.

Alternatively, in the improved electrical connection device, the spring has another termination opposite the termination and inserted in the first cylindrical housing with a flat surface enabled for its electrical contact with the support.

Alternatively, in the improved electrical connection device, the base is also provided with another hollow protrusion with the same axial axis as the base and so that it passes through the same which communicates the second cylindrical housing with the first cylindrical housing, and in which the shaft is inserted; said protrusion having hooks enabled and in contact with the same shaft to prevent the shaft from coming out of the protrusion; the end of the shaft in the first cylindrical housing having a ability to couple and anchor to an internal terminal of the support provided with electric potential; the other opposite end of the same shaft being enabled for electrically connecting to another terminal for wires.

Preferably, in the improved electrical connection device, the two terminals for wires are connected to the sockets of an electrical plug present on the same base and which is in turn enabled to connect to the external device and the corresponding ignition thereof.

Alternatively, in the improved electrical connection device, the shaft has a seat enabled to prevent it from coming out of the protrusion.

Alternatively, in the improved electrical connection device, the termination of the spring that protrudes from the second cylindrical housing is bent relative to the same second cylindrical housing.

Alternatively, in the improved electrical connection device, the terminal for wires has dimensions that make it impossible to go through the passage.

Thanks to the present invention, a reliable, simple and effective electrical connection to a previously existing electrical supply support and the consequent power supply to an electrical device, for example lighting, is achieved in a simple, precise and effective way.

Other features and advantages of the improved electrical connection device will become apparent from the description of a preferred, but not exclusive, embodiment, which is illustrated by way of non-limiting example in the accompanying drawings, wherein:

DESCRIPTION OF A PREFERRED EMBODIMENT

Figure 1A:
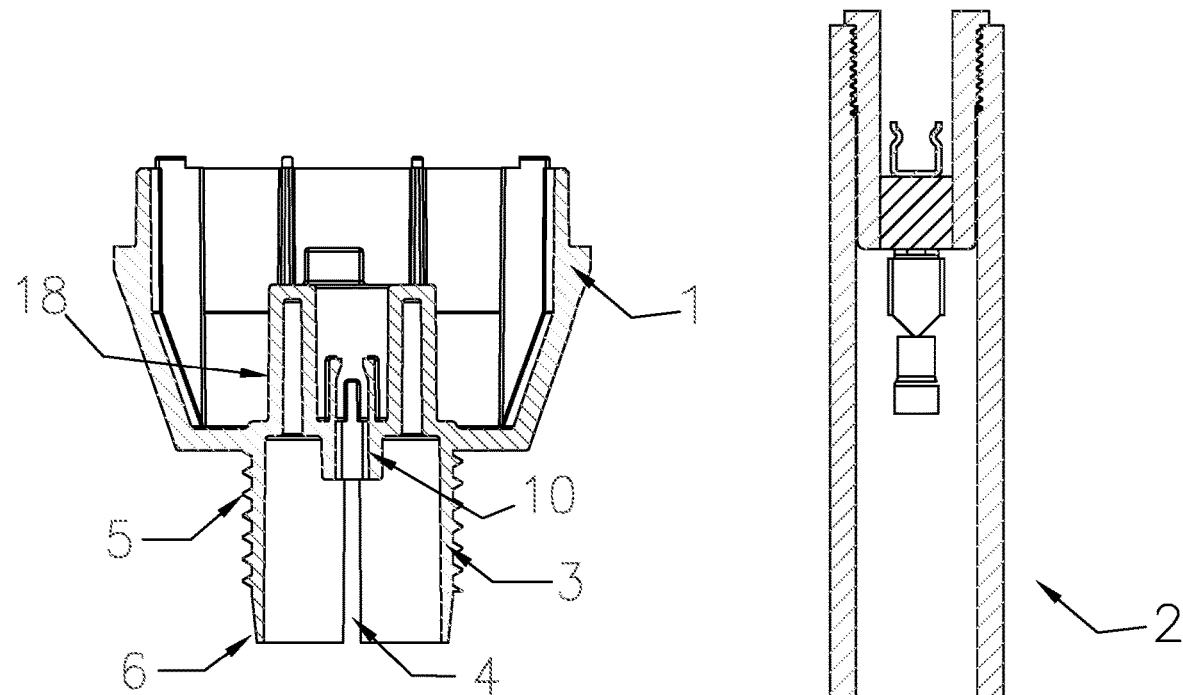
FIG. 1A is a schematic, cross-sectional, disassembled and out-of-use view of a preferred embodiment of the improved electrical connection device of the present invention, as well as of the corresponding electrical supply support on which it must be connected.
Figure 1B:
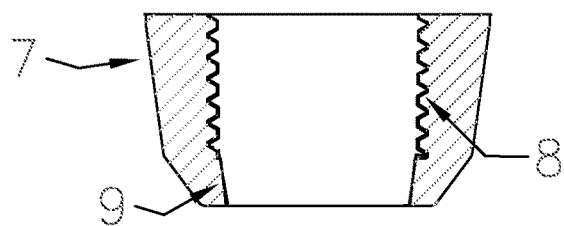
FIG. 1B is a schematic, cross-sectional, disassembled and out-of-use view of a preferred embodiment of the improved electrical connection device of the present invention, as well as of the corresponding electrical supply support on which it must be connected.
Figure 1C:
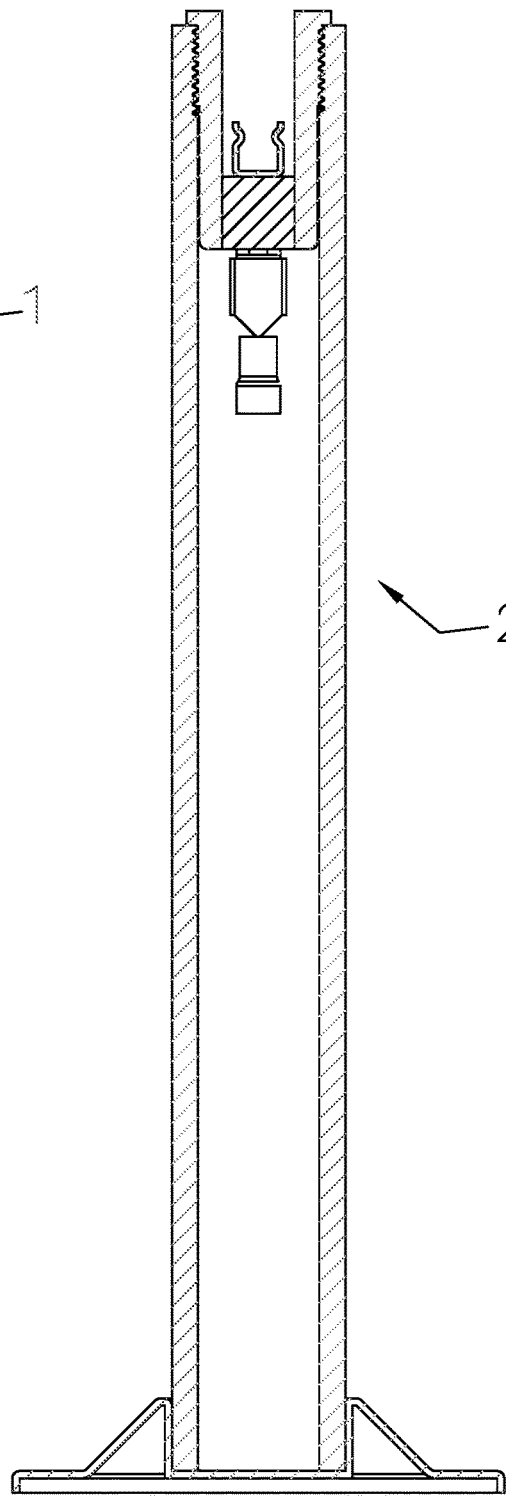
FIG. 1C is a schematic, cross-sectional, disassembled and out-of-use view of a preferred embodiment of the improved electrical connection device of the present invention, as well as of the corresponding electrical supply support on which it must be connected.

As shown schematically in FIGS. 1A, 1B, and 1C, and 2, the improved electrical connection device of the invention comprises a base 1 and an annular clamping piece 7, which are represented in cross-sections and separately in FIGS. 1A, 1B, and 1C.

The same improved electrical connection device of the invention is enabled to be linked materially and electrically to an external support 2 that provides an electric potential difference, which may already be previously standardised and is foreign to the invention, also represented in a cross-section and separately in the same FIGS. 1A, 1B, and 1C.

The same improved electrical connection device of the invention is enabled at the same time to be linked materially and electrically to an external electrically operated device 21, for example lighting, which may also already be previously standardised and is also foreign to the invention.

As shown in FIGS. 1A, 1B, and 1C, wherein the improved electrical connection device of the invention is disassembled, the base 1 is provided with a first hollow cylindrical housing 3 that extends from the same base 1 and that shares one same axis axial.

Said first cylindrical housing 3 has the external surface 5 thereof threaded and the external end 6 thereof being opposite its contact with the base 1 having a conical geometry.

The same first cylindrical housing 3 has longitudinal grooves 4 that extend to the same external end 6 thereof.

The annular piece 7 has the interior surface 8 thereof threaded, and the internal surface 8 thereof also has a conical geometry 9 in an area of the same annular piece 7 adjacent to the exterior thereof.

Figure 2:
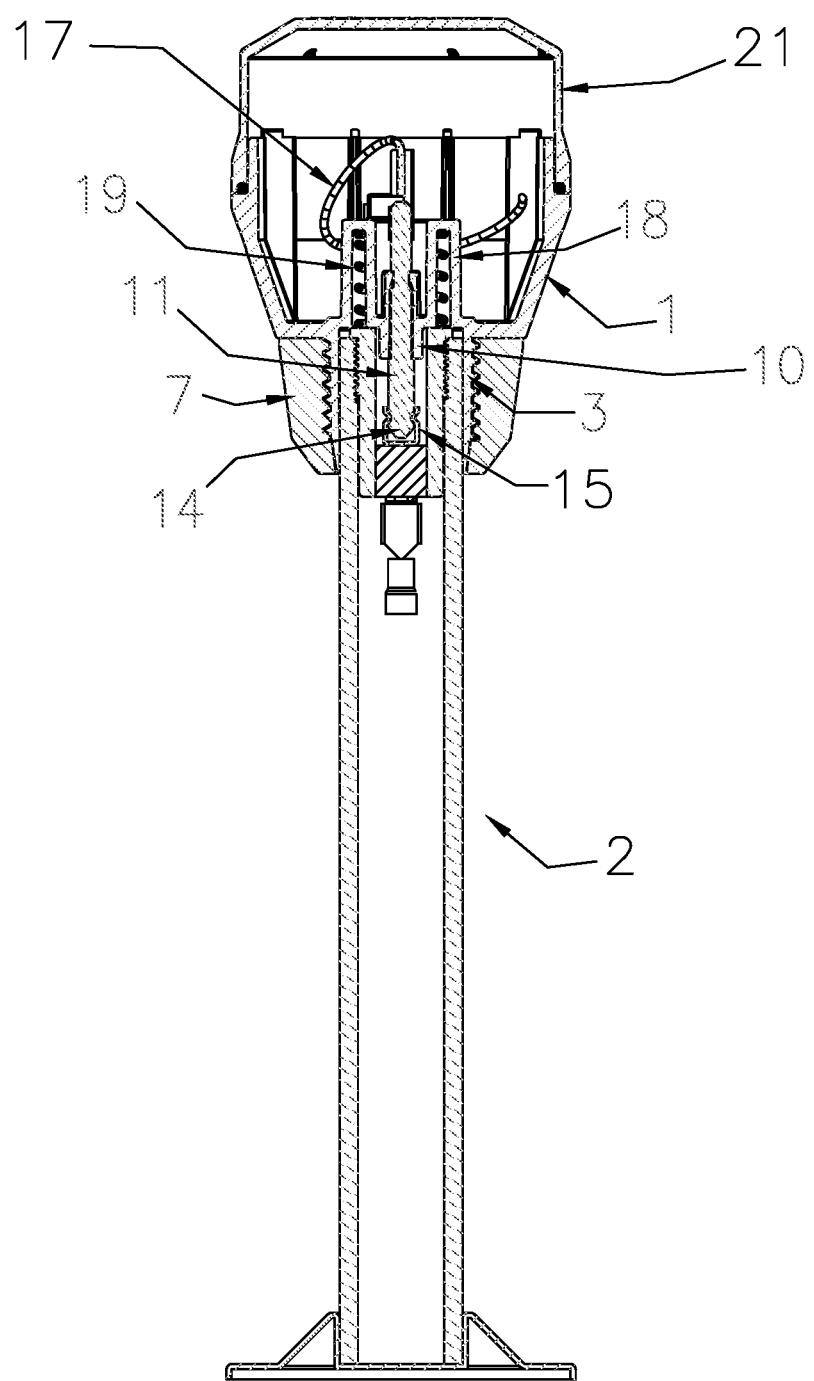
FIG. 2 is a cross-sectional schematic view of a preferred embodiment of the improved electrical connection device of the present invention, indicating the use and operation thereof with the electrical supply support.

As shown in FIG. 2, the first cylindrical housing 3 is configured to receive the insertion and adjustment in the internal contour thereof of the electrical connection support 2. The base 1 herein appears with the external luminous device 21 coupled and fitted in the same base 1.

According to the above description, the first cylindrical housing 3 and the annular piece 7 are mutually configured so that the annular piece 7 can be threaded and tightened on the outside of the first cylindrical housing 3, the conical geometries thereof being complementary at the same time that the same first cylindrical housing 3 has the external electrical connection support 2 inserted and adjusted therein. The grooves 4 of the first cylindrical housing 3 enable it to be tightened from the annular piece 7 and thus in turn be tightened on the support 2. Thus, the support 2 inserted axially inside the first cylindrical housing 3 is secured and fixed.

Figure 3:
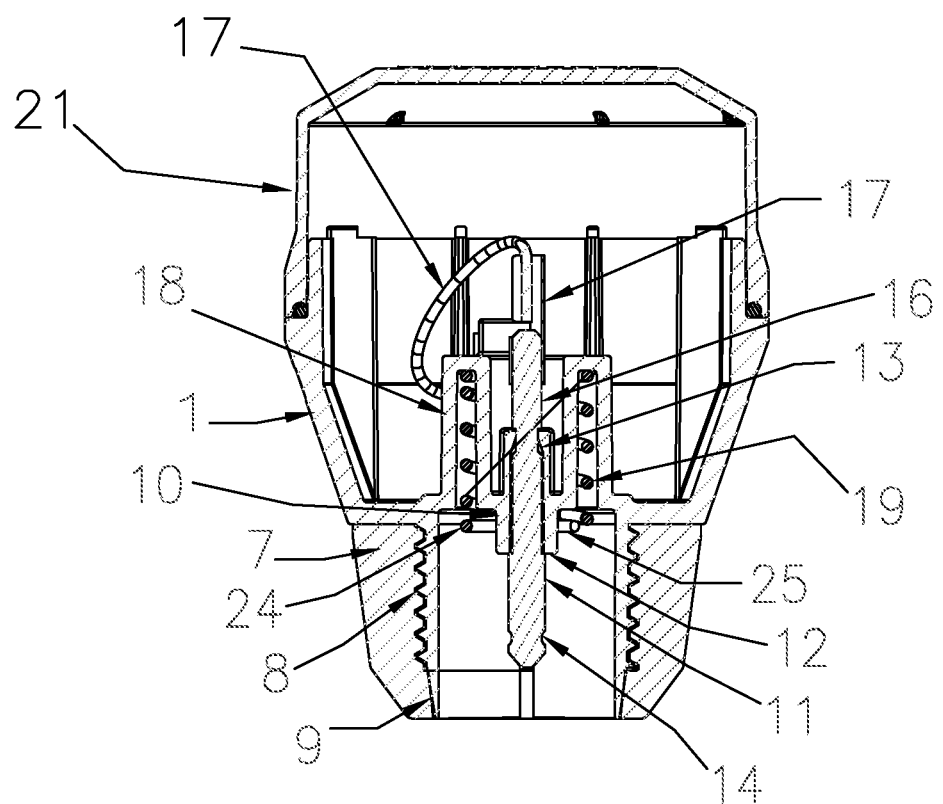
FIG. 3 is a cross-sectional schematic view of a preferred embodiment of the improved electrical connection device of the present invention, but without the electrical supply support.

Moreover, as shown in FIG. 2 and especially in greater detail in FIG. 3, the base 1 incorporates a spring 19 and a shaft 11, both with the same axial axis as the base 1 and in a through arrangement through same base 1, and enabled for receiving and transmitting the electric potential difference from the external support 2.

As shown in FIGS. 1A, 1B, 1C, 2 and 3, the base 1 has a second hollow cylindrical housing 18 with the same axial axis as the base 1 and as the first cylindrical housing 3.

Said second cylindrical housing 18 is extended from the same base 1 in a direction opposite to the first cylindrical housing 3. Furthermore, the second cylindrical housing 18 is internally in communication and in continuity with the inside of the first cylindrical housing 3.

As shown in FIG. 3, the shaft 11 and the spring 19 are both arranged in the base 1 so that it passes through the same and both have one of the ends thereof inside the first cylindrical housing 3 and the other opposite end in the second cylindrical housing 18.

FIGS. 2 and 3 also show how the second cylindrical housing 18 is enabled to contain the spring 19, and arranged in the very contour thereof and around the same axial axis thereof. In this preferred embodiment and as seen in the figures, the spring 19 is contained inside the vertical wall of the second cylindrical housing 18.

Figure 4A:
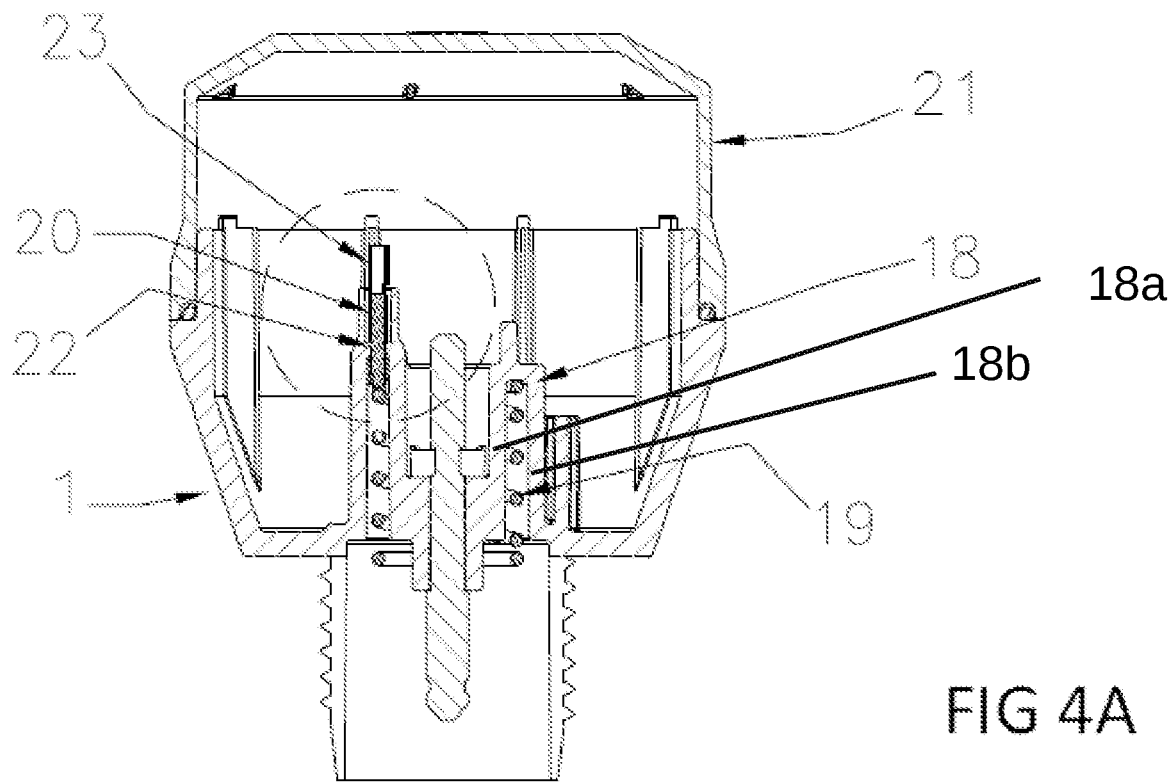
FIG. 4A is a cross-sectional schematic view of a preferred embodiment of the improved electrical connection device of the present invention.
Figure 4B:
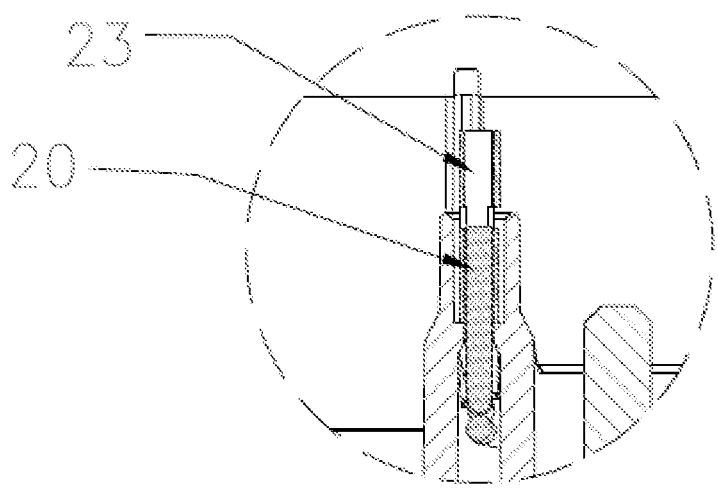
FIG. 4B is an enlarged detail for improved viewing of the cross-sectional schematic view of FIG. 4A of a preferred embodiment of the improved electrical connection device of the present invention.

As shown in FIGS. 4A and 4B, the spring 19 has a straight termination 20 parallel to the axial axis thereof and protruding from the same second cylindrical housing 18 through the end of the same second cylindrical housing 18 opposite its contact with the base 1 itself. Therein, the second cylindrical housing defining, in cross-section a U-shaped wall having a first wall section (18a) and a second wall section (18b), the spring being retained between the first wall section (18a) and the second wall section (18b). The termination 20 crosses through a passage 22 in the second cylindrical housing 18, thus penetrating inside the base 1. Furthermore, said termination 20 is enabled for connecting a standard terminal 23 for wires, as shown in the enlarged detail in the same FIGS. 4A and 4B.

Simultaneously to the above, the same spring 19 has another termination 24 opposite the termination 20, and which is inserted in the first cylindrical housing 3, as shown in FIG. 3, and also with a flat surface 25 enabled for its electrical contact with the support 2 arranged as shown in FIG. 2.

Moreover, as shown in FIGS. 1A, 1B, 1C, 2 and 3, the base 1 is also provided with another hollow protrusion 10 with the same axial axis as the base 1, and so that it passes through the same which communicates the second cylindrical housing 18 with the first cylindrical housing 3.

The shaft 11 is inserted in said protrusion 10, said protrusion 10 also having hooks 13 enabled and in contact with the same shaft 11 to prevent the shaft 11 from coming out of the protrusion 10 and thus keeping it in the correct position thereof represented in the figures. The shaft 11 also has a seat 12 to prevent it from incorrectly coming out of the protrusion 10.

At the same time, the shaft 11 has the end 14 thereof, which is inside the first cylindrical housing 3, with an ability to couple and anchor to an internal terminal 15 of the support 2 provided with electric potential, as shown in FIG. 2.

At the same time, the other end 16 opposite the same shaft 11 is enabled for electrically connecting to another standard terminal 17 for wires.

Figure 5:
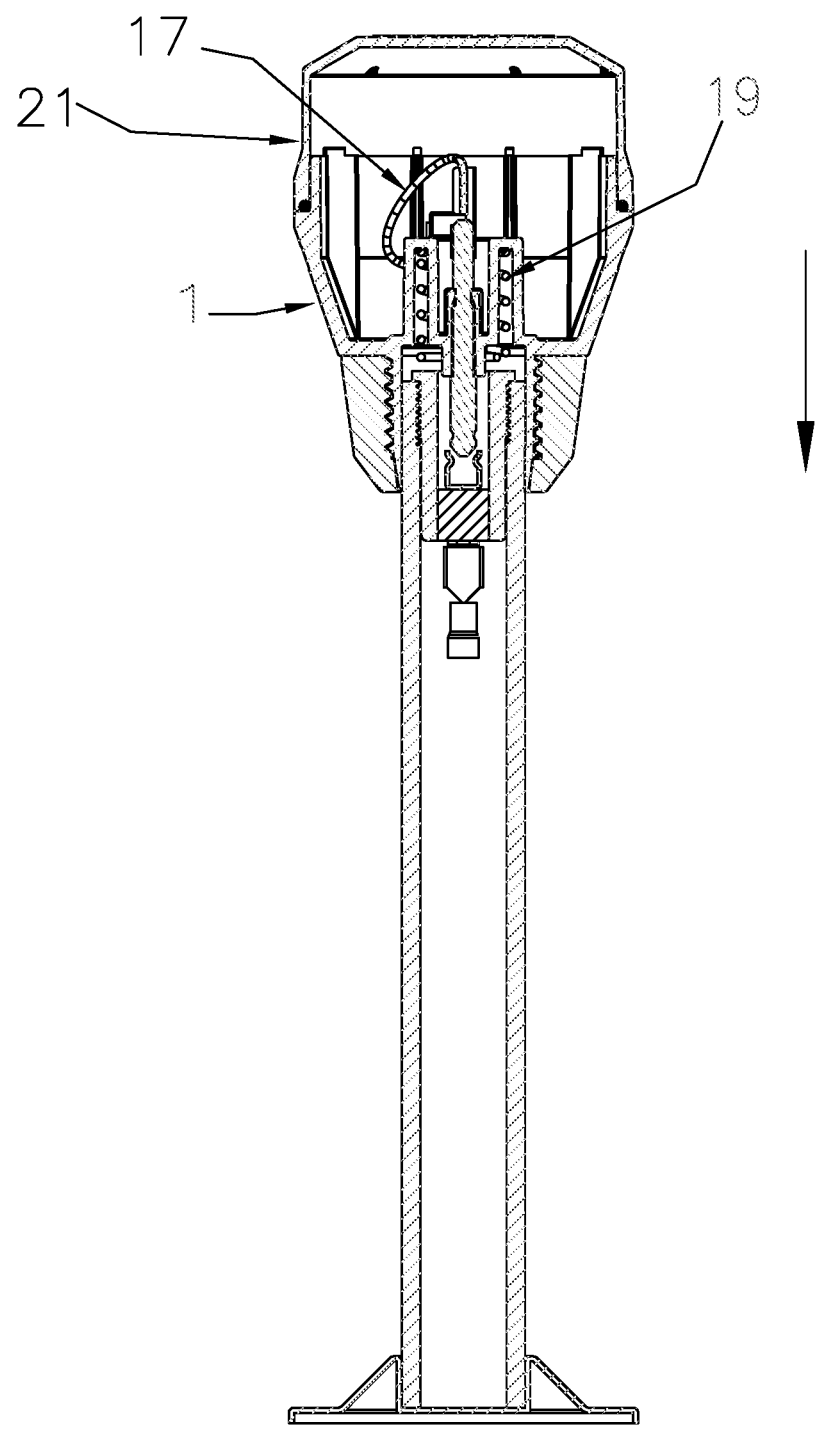
FIG. 5 is a cross-sectional schematic view of a preferred embodiment of the improved electrical connection device of the present invention, indicating the use and operation thereof with the electrical supply support together and compared to FIGS. 1A, 1B, and 1C.

In the operation and service of the improved electrical connection device of the proposed invention, the improved electrical connection device of the invention is initially arranged as shown in FIG. 5.

In order for the improved electrical connection device of the invention to be electrically linked to the support 2 and carry out its task of transmitting the electric potential present in the same support 2 to the external device 21, the base 1 must be pressed towards the same support 2, as indicated by the arrow in the same FIG. 5, thus producing a compressive force on the spring 19 that overcomes the very elastic resistance thereof.

It is then that the improved electrical connection device of the invention reaches the position represented in FIG. 2.

This means that the shaft 11 remains with the end 14 thereof coupled and locked in the internal terminal 15 of the support 2, which is provided with electric potential and is also possible given the complementary geometry of both, as shown in FIG. 2.

At the same time, in the same position reached and represented in the same FIG. 2, the termination 24 of the spring 19 also comes in electrical contact with the support 2, aided by said contact with the flat surface 25 thereof referred to above and indicated in FIG. 3.

Therefore, the shaft 11 and the spring 19 begin to present therebetween an electric potential difference transmitted from the support 2 itself.

According to the arrangement explained above, since the other end 16 of the shaft 11 is electrically connected to the standard terminal 17 for wires, and at the same time the termination 20 of the spring 19 is connected to the other standard terminal 23 for wires, all of this implies that the electric potential difference present in the support 2 is then transmitted to said standard terminals 17, 23 for wires, in order to provide the electrical supply thereof.

Figure 6:
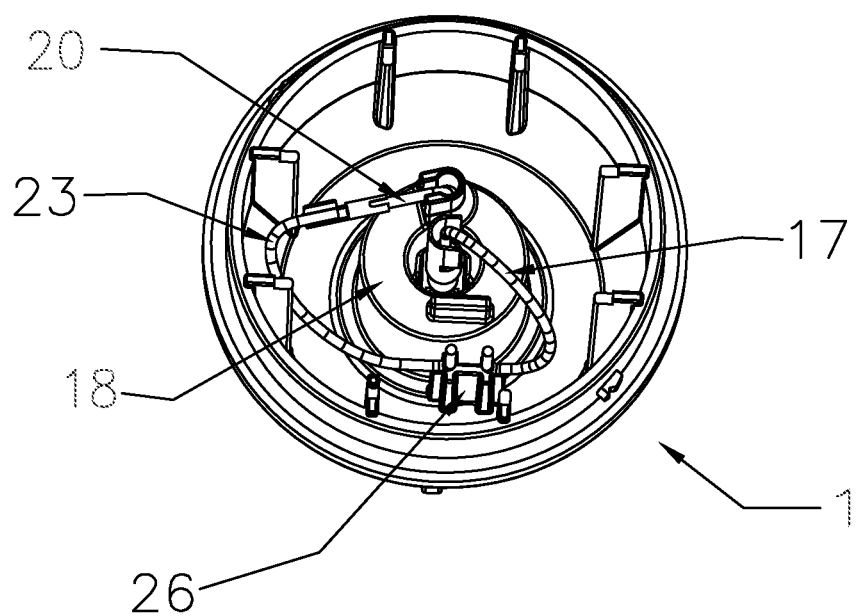
FIG. 6 is a schematic and perspective view indicating a possible interior arrangement of a preferred embodiment of the improved electrical connection device of the present invention.
Figure 7:
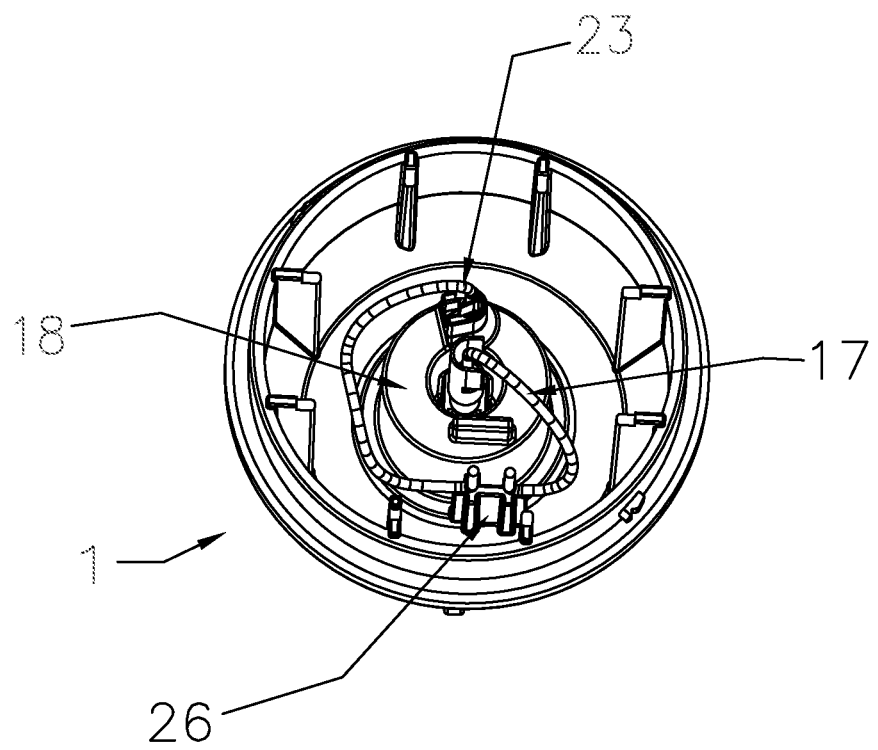
FIG. 7 is a schematic and perspective view indicating another possible interior arrangement of a preferred embodiment of the improved electrical connection device of the present invention.

In FIGS. 6 and 7, the base 1 is shown from a top perspective and it lacks the external luminous device 21 to better show the internal arrangement thereof.

In FIGS. 6 and 7 mentioned above, which schematically represent two preferred embodiments of the proposed invention, the two standard terminals 17, 23 for wires are connected to the sockets of an electrical plug 26 present on the same base 1, and which is in turn enabled to connect to the external luminous device 21 and the corresponding ignition thereof when said external device 21 is coupled to the same base 1.

Therefore, when the external luminous device 21 is coupled and fitted in the base 1, it is electrically connected to the electrical plug 26 referred to, which has an electric potential difference for the operation of the same external luminous device 21.

In FIG. 6, the termination 20 appears bent inside the base 1 itself, in order to thus prevent it from coming out of the position thereof through the passage 22.

In FIG. 7, the same termination is blocked by the electrical terminal 23 itself, such that since the latter has a larger cross-section than the spring 19, it prevents the termination 20 of the spring 19 from coming out through the passage 22.

In the improved electrical connection device of the proposed invention, thanks to the explained arrangement thereof, the same spring 19 on which the compressive force is applied for materially and electrically linking to the support 2 is also able to be a conductor of the electric potential from the same support 2. This is very advantageous since the spring 19 is an element that is simple and easy to manufacture.

The improved electrical connection device of the proposed invention therefore allows for an electrical connection to a previously existing electrical supply support 2 and the consequent power supply to an electrical device 21, for example lighting, in a simple, reliable and effective way, and it has the advantage of being much less dependent on manufacturing tolerances, easy to assemble, having a low manufacturing cost and without the need for additional and complicated specific tools.

The details, shapes, dimensions and other accessory elements, as well as the materials used to manufacture the improved electrical connection device of the invention, may be suitably substituted for others which are technically equivalent and do not diverge from the essential nature of the invention, nor the scope defined by the claims included below.

What is claimed is:

1. An electrical connection device, enabled to be linked materially and electrically to an external support that has an electric potential difference, and at the same time enabled to be linked materially and electrically to an external electrically operated device, and therefore transmitting electric potential between said external support and said external device, the electrical connection device comprising:

a base that incorporates a spring and a shaft enabled for receiving and transmitting the electric potential difference from the external support, and being arranged and enabled on the same base in order to make electrical contact with the support of a compressive force on said spring;

wherein the second cylindrical housing defining in cross-section a U-shaped wall having a first wall section and a second wall section, the spring being retained between the first wall section and the second wall section wherein the first wall section and the second wall section define a common axial axis, the spring has a straight termination parallel to the axial axis thereof and protruding from the same second cylindrical housing at the end of the same second cylindrical housing opposite its contact with the base itself, said termination also being enabled for connecting a terminal for wires.

2. The electrical connection device according to claim 1, wherein the spring and the shaft both have one same axial axis as the base and at the same time pass through the base.

3. The electrical connection device according to claim 1, further comprising an annular clamping piece; the base being provided with a first hollow cylindrical housing that extends from the same base and shares one same axial axis, said first cylindrical housing having the external surface thereof threaded and the external end thereof opposite its contact with the base having a conical geometry, and the same first cylindrical housing having longitudinal grooves that extend to the same external end thereof; said first cylindrical housing being configured to receive the insertion and adjustment in the internal contour thereof of the electrical connection support; the annular piece having the internal surface thereof threaded and the internal surface thereof also having a conical geometry in an area of the same annular piece adjacent to the outside thereof; the first cylindrical housing and the annular piece being mutually configured so that the annular piece can be threaded and tightened on the outside of the first cylindrical housing, the conical geometries thereof also being complementary, at the same time that the same first cylindrical housing has the external electrical connection support inserted and adjusted therein.

4. The electrical connection device according to claim 1, wherein the base has a second hollow cylindrical housing with the same axial axis as the base and as the first cylindrical housing, extending from the same base in a direction opposite to the first cylindrical housing; said second cylindrical housing being internally in communication and in continuity with the inside of the first cylindrical housing.

5. The electrical connection device according to claim 1, wherein the shaft and the spring have one of the ends thereof in the first cylindrical housing and the other opposite end thereof in the second cylindrical housing.

6. The electrical connection device according to claim 1, wherein the second cylindrical housing has a passage enabled to be crossed through by the termination of the spring and the protrusion thereof from the same second cylindrical housing.

7. The electrical connection device according to claim 1, wherein the spring has another termination opposite the termination and which is inserted in the first cylindrical housing with a flat surface enabled for its electrical contact with the support.

8. The electrical connection device according to claim 1, wherein the base is also provided with another hollow protrusion with the same axial axis as the base and so that it passes through the same which communicates the second cylindrical housing with the first cylindrical housing, and in which the shaft is inserted; said protrusion having hooks enabled and in contact with the same shaft to prevent the shaft from coming out of the protrusion; the end of the shaft in the first cylindrical housing having an ability to couple and anchor to an internal terminal of the support provided with electric potential; the other opposite end of the same shaft being enabled for electrically connecting to another terminal for wires.

9. The electrical connection device according to claim 1, wherein the two terminals for wires are connected to the sockets of an electrical plug present on the same base and which is in turn enabled to connect to the external device and the corresponding ignition thereof.

10. The electrical connection device according to claim 1, wherein the shaft has a seat enabled to prevent it from coming out of the protrusion.

11. The electrical connection device according to claim 1, wherein the termination of the spring protruding from the second cylindrical housing is bent relative to the same second cylindrical housing.

12. The electrical connection device according to claim 1, wherein the terminal for wires has dimensions that make it impossible to travel through the passage.

13. An electrical connection device for signaling vehicles, enabled to be linked materially and electrically to an external support of the vehicle to be signalized that has an electric potential difference, and at the same time enabled to be linked materially and electrically to an external electrically lighting operated device for signaling the vehicles, and therefore transmitting electric potential between said external support and said lighting device, the electrical connection device comprising:

a base that incorporates a spring and a shaft enabled for receiving and transmitting the electric potential difference from the external support, and being arranged on the same base, wherein in order to make electrical contact with the support, the shaft is electrically connectable to both an internal terminal of the support and to a terminal for wires, wherein the spring further comprises opposite terminations for electrically contacting, respectively, another terminal for wires and the support, the spring being movable inside the base, by means of a compressive force on said spring for switching between transmitting the electrical potential, when the shaft is in contact with the external support, and not transmitting the electrical potential, when the shaft is not in contact with the external support;

the electrical connection device further comprising a coaxial second hollow cylindrical housing extending from the base in a direction opposite to the first cylindrical housing, and internally in communication and in continuity with the inside of the first cylindrical housing, wherein the second cylindrical housing is enabled to contain the spring arranged in the very contour there and around the same axial axis, thereof, the terminations of the spring comprising a straight termination parallel to the axial axis thereof and protruding from the same second cylindrical housing at the end of the same second cylindrical housing opposite its contact with the base itself.

14. The electrical connection device according to claim 13, wherein the spring and the shaft both have one same axial axis are contained within the base.

15. The electrical connection device according to claim 13, further comprising an annular clamping piece; the base being provided with a first hollow cylindrical housing that extends from the same base and shares one same axial axis, said first cylindrical housing having the external surface thereof threaded and the external end thereof opposite its contact with the base having a conical geometry, and the same first cylindrical housing having longitudinal grooves that extend to the same external end thereof; said first cylindrical housing being configured to receive the insertion and adjustment in the internal contour thereof of the electrical connection support; the annular piece having the internal surface thereof threaded and the internal surface thereof also having a conical geometry in an area of the same annular piece adjacent to the outside thereof; the first cylindrical housing and the annular piece being mutually configured so that the annular piece can be threaded and tightened on the outside of the first cylindrical housing, the conical geometries thereof also being complementary, at the same time that the same first cylindrical housing has the external electrical connection support inserted and adjusted therein.

16. The electrical connection device according to claim 13, wherein the shaft and the spring have one of the ends thereof in the first cylindrical housing and the other opposite end thereof in the second cylindrical housing.

17. The electrical connection device according to claim 13, wherein the spring is contained inside the vertical wall of the second cylindrical housing.

18. The electrical connection device according to claim 13, wherein the second cylindrical housing has a passage enabled to be crossed through by the termination of the spring and the protrusion thereof from the same second cylindrical housing.

19. The electrical connection device according to claim 13, wherein the terminations of the spring further comprise another termination opposite the termination and which is inserted in the first cylindrical housing with a flat surface enabled for its electrical contact with the support.

20. The electrical connection device according to claim 13, wherein the base is also provided with another hollow protrusion with the same axial axis as the base and so that it passes through the same which communicates the second cylindrical housing with the first cylindrical housing, and in which the shaft is inserted; said protrusion having hooks enabled and in contact with the same shaft to prevent the shaft from coming out of the protrusion; the end of the shaft in the first cylindrical housing having an ability to couple and anchor to an internal terminal of the support provided with electric potential; the other opposite end of the same shaft being enabled for electrically connecting to another terminal for wires.

* * * * *